Nov. 7, 1933.  W. H. HOLTOM  1,934,066
LUBRICATOR
Filed Nov. 22, 1930   2 Sheets-Sheet 1

INVENTOR
William H. Holtom
BY
Synnestvedt & Lechner
ATTORNEYS

Nov. 7, 1933.  W. H. HOLTOM  1,934,066
LUBRICATOR
Filed Nov. 22, 1930  2 Sheets-Sheet 2

INVENTOR
William H. Holtom
BY
Symmestvedt & Lechner
ATTORNEYS

Patented Nov. 7, 1933

1,934,066

UNITED STATES PATENT OFFICE 1,934,066

LUBRICATOR

William H. Holtom, Paducah, Ky., assignor to Franklin Railway Supply Company, New York, N. Y., a corporation of Delaware Application November 22, 1930
Serial No. 497,407

16 Claims. (Cl. 308—46)

This invention relates to lubricators, particularly the type which are adapted for use in connection with railway vehicle axle boxes such, for example, as the driving boxes of a locomotive.

In general, it is the object of the present invention to provide lubricator equipment for driving or other axle boxes which is simple, compact and rugged in construction as well as conveniently repacked or refilled with suitable lubricating material.

More specifically, the present invention has in view the provision of a novel form of cover plate or closure for a lubricator of the type referred to, the same being provided with means, of a desirable type, for maintaining the cover plate in closed position and also permitting easy or convenient opening thereof for purposes of repacking. In addition, it might be noted that various types of cover plate holding means heretofore employed have been unsatisfactory for various reasons such, for example, as insufficient strength to withstand the wear and tear of long and continued service.

Still further, designs or arrangements of cover plate holding devices heretofore employed, in addition to being more or less subject to breakage, have not been sufficiently secure. In other words, one of the difficulties heretofore encountered has been that the cover plates of the lubricators employed permitted opening of the lubricator by jarring, vibration or the like. The danger of weakness or insecurity will be apparent when it is considered that, with a great many standard types of lubricators, opening of the cover plate therefor permits the lubricator elements to work their way out of the cavities in the boxes with which they are associated. The present invention has in view the elimination of the undesirable features referred to above and at the same time the provision of a lubricator cover plate and associated holding means which are readily accessible and conveniently opened and closed at inspection times.

How the foregoing, together with other objects and advantages which will occur to those skilled in the art, are obtained, will be clear from a consideration of the following description taken with the accompanying drawings, in which two embodiments of the invention are illustrated.

Of the drawings:—

Figure 1:
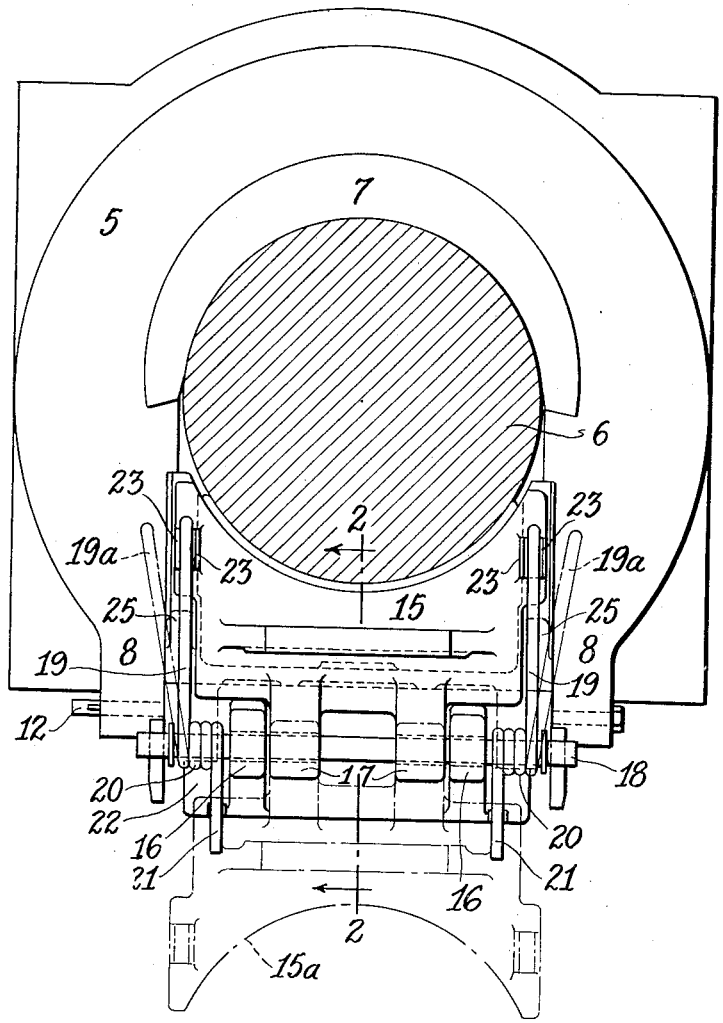
Figure 1 is an end view of a locomotive driving box having the lubricator elements of the present invention applied thereto.
Figure 2:
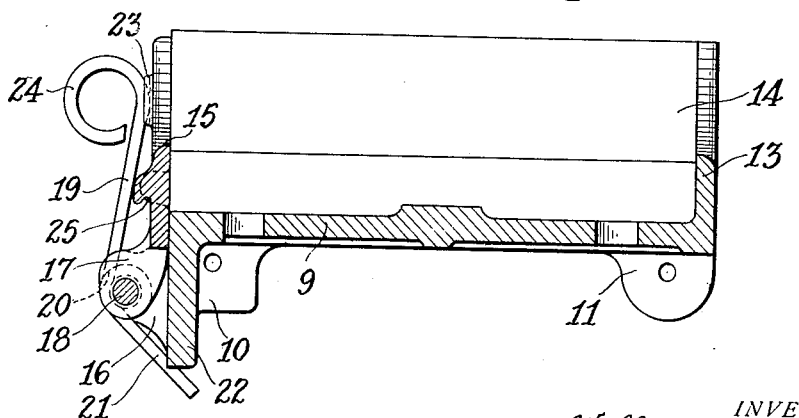
Figure 2 is a sectional view taken substantially as indicated by the line 2—2 of Figure 1.

By reference first to Figures 1 and 2, it will be seen that the locomotive driving box proper is indicated by the reference character 5. The axle housed within the box is indicated at 6 and the crown brass at 7. The legs 8—8 of the driving box extend downwardly at each side of the axle 6 and form a cavity adapted to receive lubricator parts.

In this case the lubricator parts include a cellar member 9 which is directly supported by and between the legs 8—8 of the box 5, lugs 10 and 11 at each side of the cellar 9 and a pin 12 being provided for this purpose. The cellar member 9 has an end wall 13 and side walls 14 which cooperate in forming a pocket adapted to receive suitable lubricator elements (not shown) such, for example, as a perforated distributing plate, a grease cake and suitable follower means.

The cover plate 15 according to this embodiment of the invention is secured to the cellar member 9 by means of apertured lugs 16 carried by the latter, cooperating apertured lugs 17 being arranged at the lower edge of the plate 15. A pin 18 extends through the apertures in the two sets of lugs 16 and 17 and thus provides a pivot axis on which the plate 15 may be swung or moved between closed and opened positions, the said plate being illustrated in Figure 1 in full lines in the closed position, and in dotted lines in open position (see reference character 15a).

The means for retaining the cover plate 15 in its closed position includes a pair of spring members 19, one arranged at each side of the plate. Each spring 19 has a coiled portion 20 mounted on the pin 18 and one end of each spring is extended downwardly as indicated at 21 to engage the depending lip or flange 22 at the open end of the cellar member 9. The other end of each one of the springs extends upwardly from the pin 18 and seats in the socket provided by the pairs of projections or lugs 23 which are formed on the outer face of the plate 15. In addition, the upper end of each one of the springs 19 is bent or coiled as indicated at 24 (see Fig. 2) in order to provide a convenient grip by means of which the springs may be displaced laterally outwardly beyond the edges of the cover plate where it is desired to open the same.

In Figure 1 the springs 19 are illustrated in their displaced positions at 19a and from inspection of this figure it will be seen that the displacement is sufficient to permit the plate to be swung outwardly and downwardly on its pivot axis 18 and thus completely expose the interior of the cellar member 9. Means, in the nature of lugs or stops 25, are mounted on the side walls of the cellar 9 and serve to maintain the springs 19 in their outwardly displaced positions.

Finally, in connection with the springs 19, it should be noted that the arrangement and configuration thereof is such that their upper ends are constantly urged toward the plate 23 with pressure sufficient to maintain the cover plate very securely in its closed position, it being noted that the reaction of the spring elements is torsional in character, the depending flange 22 of the cellar member serving as the fixed point of reaction.

Figure 3:
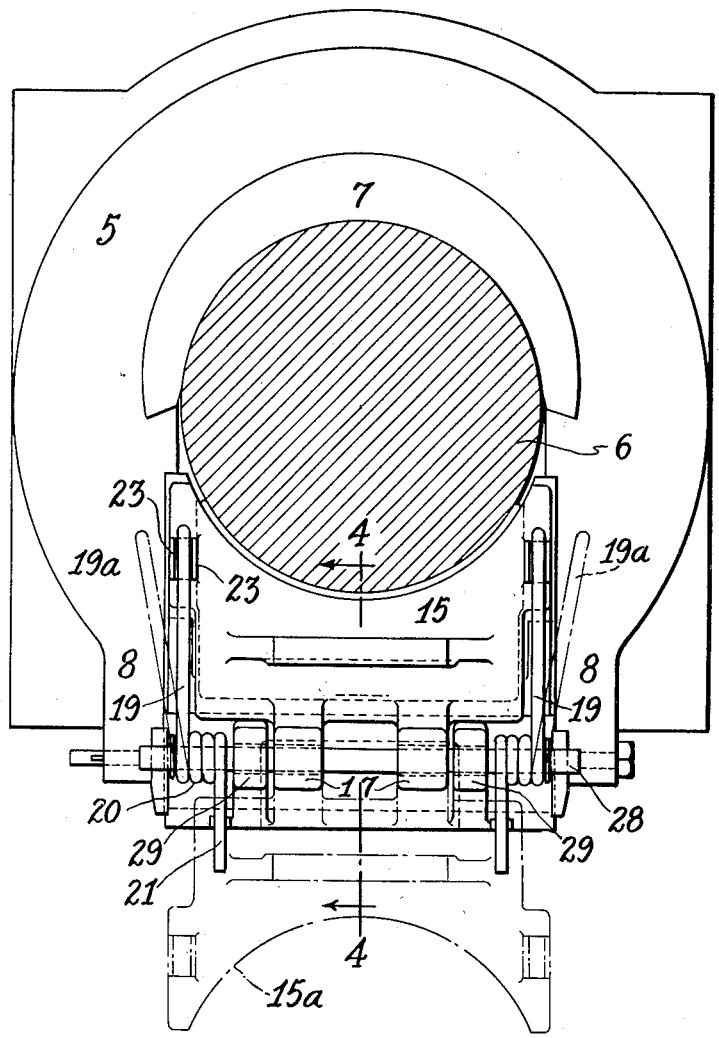
Figure 3 is a view similar to Figure 1, but illustrating a modified application of the invention to a locomotive driving box.
Figure 4:
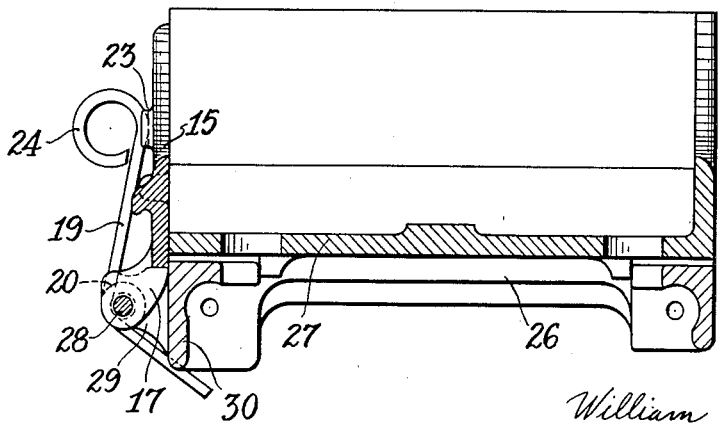
Figure 4 is a view taken substantially as indicated by the section line 4—4 applied to Figure 3.

In Figures 3 and 4, the invention is illustrated as being applied to a box construction in which a separate spreader member 26 is secured between the box legs 8 and on which the cellar member 27 is supported. In this case the cover member 15 is the same as described above in connection with Figures 1 and 2. Here, however, the cover plate is mounted on a pin 28 which passes through the apertures of the lugs 17 and through apertures in lugs 29 which are carried by the spreader member 26. The spring construction for maintaining the plate in closed position is also the same as that described above, with the exception that the point of reaction of the depending portions 21 of the springs 19 is at the lower and outer edge of the flange 30, depending from the spreader member 26.

It will be understood, of course, that the construction of Figures 3 and 4, in general, differs from that illustrated in Figures 1 and 2 by the inclusion of a cellar member 27 which is removable from the journal box independently of the spreader member 26 and also without the removal of any pins or other securing devices such as those indicated at 12 in Figure 1. It will be seen, therefore, that without any substantial change the apparatus of the present invention may be applied to any one of a number of the various types of journal boxes now in common use.

From the foregoing, it will be clear that the present invention provides a compact, rugged and secure holding means for a lubricator cover plate. At the same time, the structure provides for convenient inspection of the interior of the lubricator cavity. Finally, in connection with the security of the device, attention is called to the fact that two separate and independently operating elements are employed for maintaining the cover plate in its closed position. As a result, a dual safeguard is provided and if any abnormal circumstances cause breakage or displacement of one of the springs 19, the other spring will still be operative to maintain the plate in its closed position.

What I claim is:—

1. An axle box construction including a box structure having a cavity adapted to receive lubricator elements and an opening at a side thereof to provide access to said elements, a cover for said opening pivotally mounted for flatwise movement toward and away from said opening, and means for retaining the cover in closed position including a spring member reacting against the cover in the direction of closing movement thereof, the spring member being constructed and mounted for manual displacement to permit opening of the cover and means carried by the cover and normally engaging the spring member to prevent displacement thereof.

2. An axle box construction including a box structure having a cavity adapted to receive lubricator elements and an opening to provide access to said elements, a cover for said opening mounted for generally flatwise movement between open and closed positions and means for retaining the cover in closed position including a spring member reacting against the cover but mounted and constructed to provide for manual displacement, out of the path of movement of the cover, to permit opening thereof, together with means for retaining the spring member in displaced position.

3. An axle box construction including a box structure, a removable lubricant cellar therein, a cover plate for said cellar carried thereby and movable between open and closed positions and means for retaining the plate in closed position including spring means normally reacting against the plate but constructed to be resiliently displaceable out of the path of movement of the plate to permit opening thereof, together with means carried by the cellar for retaining the spring means in displaced position.

4. An axle box construction including a box structure having legs extending downwardly at the sides of the axle, a spreader member between the legs, a lubricator cover plate mounted on the spreader member for movement between open and closed positions and means for retaining the cover plate in closed position including a spring member normally reacting against the plate but displaceable out of the path of movement to permit opening movement thereof.

5. An axle box construction including a box structure having legs extending downwardly at the sides of the axle, a spreader member between the legs, a lubricator cover plate mounted on the spreader member for movement between open and closed positions and means for retaining the cover plate in closed position including a spring member normally reacting against the plate but displaceable out of the path of movement to permit opening movement thereof and means normally engaging said spring member to prevent displacement thereof.

6. An axle box construction including a box structure having legs extending downwardly at the sides of the axle, a spreader member between the legs, a lubricator cover plate mounted on the spreader member for movement between open and closed positions and means for retaining the cover plate in closed position including a spring member normally reacting against the plate but displaceable out of the path of movement to permit opening movement thereof, together with means for retaining the spring member in displaced position.

7. An axle box construction including a box structure having legs extending downwardly at the sides of the axle, a spreader member between the legs, a lubricator cellar on said spreader member, a lubricator cover plate mounted on the spreader member for movement between open and closed positions and means for retaining the cover plate in closed position including a spring member normally reacting against the plate but displaceable out of its path of movement to permit opening thereof, together with means on the cellar adapted to engage the spring member, to retain it in displaced position.

8. An axle box construction including a box structure having legs extending downwardly at the sides of the axle, a spreader member between the legs, a lubricator cellar on said spreader member, a lubricator cover plate mounted on the spreader member for movement between open and closed positions and means for retaining the cover plate in closed position including a spring member normally reacting against the plate but displaceable out of its path of movement to permit opening thereof, and spring seat means on said plate normally engaging the spring member to prevent displacement thereof, together with means on the cellar adapted to engage the spring member to retain it in displaced position.

9. In apparatus of the character described, a pivot pin, a lubricator cover plate mounted thereon for pivotal movement between open and closed positions, means for retaining the plate in closed position including a torsionally reactive spring member supported by said pin and bearing against said plate but constructed to be resiliently displaceable out of the path of movement of the plate to permit opening thereof.

10. In combination, a lubricator cover plate pivotally mounted for movement generally flatwise between open and closed positions and means for retaining the plate in closed position including a pair of spaced spring members positioned toward opposite edges of the cover plate and normally reacting against the plate but displaceable laterally in opposite directions out of the path of movement of the plate to permit opening and closing thereof, together with means for retaining said spring members in their displaced positions.

11. An axle box construction having a lubricator cavity therein open at an end for removal and insertion of lubricator elements, a cover or closure plate for the open end of said cavity pivotally mounted for movement between open and closed positions, and a mechanism for retaining the plate in closed position including an elongated spring element normally reacting against said plate in the direction of closing movement thereof to urge it toward closed position, part of the spring being resilient in a plane generally at right angles to the plane of normal reaction, whereby the spring element may be displaced, by deformation or deflection thereof, out of the path of movement of the cover plate to permit opening of the lubricator cavity.

12. In a locomotive driving box having a lubricator cavity therein open at one end for removal and insertion of lubricator elements generally lengthwise of the driving axle, a cover or closure member for said cavity pivotally mounted toward a lower edge thereof for swinging movement between open and closed positions, and a mechanism for maintaining said cover in closed position, said mechanism including a torsionally reactive spring element bearing against said cover, and part of said spring element being resilient in a plane generally at right angles to the plane in which the torsional reaction is effective to maintain the cover in closed position, whereby said element may be displaced by deformation or deflection thereof out of the path of movement of the cover to permit opening of the lubricator cavity.

13. In a locomotive driving box having a lubricator cavity therein open at one end for removal and insertion of lubricator elements generally lengthwise of the driving axle, a cover or closure member for said cavity pivotally mounted toward a lower edge thereof for swinging movement between open and closed positions, a mechanism for maintaining said cover in closed position, said mechanism including a torsionally reactive spring element bearing against said cover, and part of said spring element being resilient in a plane generally at right angles to the plane in which the torsional reaction is effective to maintain the cover in closed position, whereby said element may be displaced by deformation or deflection thereof out of the path of movement of the cover to permit opening of the lubricator cavity, and means for maintaining said spring element in deformed position.

14. In a locomotive driving box having a lubricator cavity therein open at one end for removal and insertion of lubricator elements generally lengthwise of the driving axle, a cover or closure member for said cavity pivotally mounted toward a lower edge thereof for swinging movement between open and closed positions, a mechanism for maintaining said cover in closed position, said mechanism including a torsionally reactive spring element bearing against said cover, and part of said spring element being resilient in a plane generally at right angles to the plane in which the torsional reaction is effective to maintain the cover in closed position, whereby said element may be displaced by deformation or deflection thereof out of the path of movement of the cover to permit opening of the lubricator cavity, and stop means positioned to be engaged by said spring element upon deflection thereof as aforesaid under the influence of the torsional spring reaction.

15. In a locomotive driving axle box structure having a lubricator cavity therein with an opening for insertion and removal of lubricator elements in a direction generally paralleling the axle, a cover or closure member for said cavity pivotally mounted toward a lower portion thereof to provide for swinging movement of the cover between open and closed positions, and a mechanism for securing the cover in closed position including a torsionally reactive spring element operatively interposed between the cover and a normally fixed part of the structure, said spring element having an intermediate coiled part from which the end portions thereof extend to cooperate with said cover and said fixed part, and said spring element further having at least one of its end portions constructed for elastic or resilient deformation out of its normal operative position, whereby to provide for removal of the torsional spring reaction from the cover, together with means for retaining the deformable portion of the spring element in deformed position.

16. In combination, a lubricator cover plate pivotally mounted for movement generally flatwise between open and closed positions and means for retaining the plate in closed position including a pair of spaced spring members normally reacting against outer sides of the plate to urge it to closed position but displaceable laterally in opposite directions out of the path of movement of the plate to permit opening and closing thereof, together with means for retaining said spring members in their displaced positions, and spring seat means normally preventing displacement of the spring members.

W. H. HOLTOM.